(12) United States Patent
Taylor et al.

(10) Patent No.: US 7,534,745 B2
(45) Date of Patent: *May 19, 2009

(54) GELLED INVERT EMULSION COMPOSITIONS COMPRISING POLYVALENT METAL SALTS OF AN ORGANOPHOSPHONIC ACID ESTER OR AN ORGANOPHOSPHINIC ACID AND METHODS OF USE AND MANUFACTURE

(75) Inventors: Robert S. Taylor, Calgary (CA); Gary P. Funkhouser, Duncan, OK (US); Ronald G. Dusterhoft, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/839,433

(22) Filed: May 5, 2004

(65) Prior Publication Data
US 2005/0250652 A1 Nov. 10, 2005

(51) Int. Cl.
- C09K 8/64 (2006.01)
- E21B 43/26 (2006.01)
- E21B 43/04 (2006.01)
- E21B 33/00 (2006.01)
- E21B 37/00 (2006.01)

(52) U.S. Cl. ............ 507/128; 507/238; 166/271; 166/278; 166/285; 166/311

(58) Field of Classification Search .......... 507/128, 507/238; 166/270, 271, 276, 278, 280.1, 166/285, 311
See application file for complete search history.

(56) References Cited

U.S. PATENT DOCUMENTS

| | | | |
|---|---|---|---|
| 2,983,678 A | 5/1961 | Pellegrini, Jr. et al. ...... 252/32.5 |
| 3,494,949 A | 2/1970 | Monroe et al. ............ 260/448 |
| 3,505,374 A | 4/1970 | Monroe ................... 260/439 |
| 3,575,859 A | 4/1971 | Monroe ................... 252/32.5 |
| 3,757,864 A | 9/1973 | Crawford et al. ........... 166/308 |
| 3,798,162 A | 3/1974 | Dickert, Jr. et al. ........ 252/32.5 |
| 4,003,393 A | 1/1977 | Jaggard et al. .............. 137/15 |
| 4,007,128 A | 2/1977 | Poklacki ................... 523/451 |
| 4,104,173 A | 8/1978 | Gay et al. .................. 507/238 |
| 4,153,649 A | 5/1979 | Griffin, Jr. ................. 558/110 |
| 4,200,539 A | 4/1980 | Burnham et al. ........... 507/238 |
| 4,200,540 A | 4/1980 | Burnham ................... 507/238 |
| 4,316,810 A | 2/1982 | Burnham ................... 507/238 |
| 4,473,408 A | 9/1984 | Purinton, Jr. ................. 134/8 |
| 4,507,213 A | 3/1985 | Daccord et al. ............ 507/238 |
| 4,579,668 A * | 4/1986 | Messenger ................. 507/118 |
| 4,622,155 A | 11/1986 | Harris et al. ............... 507/238 |
| 4,670,550 A | 6/1987 | Bleeker et al. .............. 536/114 |
| 4,877,894 A | 10/1989 | Huddleston ................ 558/113 |
| 5,034,139 A | 7/1991 | Reid et al. ................ 252/8.512 |
| 5,057,233 A | 10/1991 | Huddleston ................ 507/238 |
| 5,106,516 A | 4/1992 | Mueller et al. ............ 507/138 |
| 5,110,485 A | 5/1992 | Huddleston ................ 507/238 |
| 5,190,675 A | 3/1993 | Gross ........................ 507/238 |
| 5,202,035 A | 4/1993 | Huddleston ................ 507/238 |
| 5,232,910 A | 8/1993 | Mueller et al. ............ 507/138 |
| 5,252,554 A | 10/1993 | Mueller et al. ............ 507/138 |
| 5,254,531 A | 10/1993 | Mueller et al. ............ 507/131 |
| 5,271,464 A | 12/1993 | McCabe .................... 166/295 |
| 5,318,954 A | 6/1994 | Mueller et al. ............ 507/138 |
| 5,318,955 A | 6/1994 | Mueller et al. ............ 507/139 |
| 5,403,822 A | 4/1995 | Mueller et al. ............ 507/138 |
| 5,417,287 A | 5/1995 | Smith et al. ............... 166/308 |
| 5,514,645 A | 5/1996 | McCabe et al. ............ 507/238 |
| 5,571,315 A | 11/1996 | Smith et al. ............... 106/285 |
| 5,614,010 A | 3/1997 | Smith et al. ............... 106/285 |
| 5,647,900 A | 7/1997 | Smith et al. ............... 106/285 |
| 5,846,915 A | 12/1998 | Smith et al. ............... 507/269 |
| RE36,066 E | 1/1999 | Mueller et al. ............ 507/138 |
| 5,888,944 A | 3/1999 | Patel ......................... 166/300 |
| 5,890,533 A | 4/1999 | Jones ......................... 166/51 |
| 5,905,061 A | 5/1999 | Patel ......................... 507/129 |
| 5,977,031 A | 11/1999 | Patel ......................... 507/138 |
| 5,985,800 A | 11/1999 | Patel ......................... 507/129 |
| 5,990,050 A | 11/1999 | Patel ......................... 507/136 |
| 6,004,908 A | 12/1999 | Graham et al. ............ 507/238 |
| 6,029,755 A | 2/2000 | Patel ......................... 175/50 |
| 6,054,417 A | 4/2000 | Graham et al. ............ 507/238 |
| 6,131,661 A | 10/2000 | Conner et al. ............. 166/300 |
| 6,149,693 A | 11/2000 | Geib .......................... 44/270 |

(Continued)

FOREIGN PATENT DOCUMENTS

EP 1 234 948 A1 8/2002

OTHER PUBLICATIONS

Foreign communication from a related couterpart application dated Aug. 16, 2005.

(Continued)

Primary Examiner—Timothy J Kugel
(74) Attorney, Agent, or Firm—Craig W. Roddy; Baker Botts, LLP

(57) ABSTRACT

The present invention relates to emulsion compositions and associated methods. More particularly, the present invention relates to gelled invert emulsion compositions and their associated methods of use and preparation. In one embodiment, the present invention provides a method of treating a portion of a subterranean formation comprising the steps of: providing a gelled invert emulsion composition that comprises an oleaginous continuous phase, a discontinuous phase, and a gelling agent; and treating a portion of the subterranean formation. The present invention also provides methods of increasing the viscosity of an invert emulsion composition, methods of making gelled invert emulsion compositions, methods of providing some degree of sand control to portions of subterranean formations, methods of fracturing a portion of a subterranean formation, and gelled invert emulsion compositions.

55 Claims, No Drawings

U.S. PATENT DOCUMENTS

| | | | |
|---|---|---|---|
| 6,218,342 B1 | 4/2001 | Patel | 507/129 |
| 6,258,859 B1 | 7/2001 | Dahayanake et al. | 516/77 |
| 6,271,409 B1 | 8/2001 | Geib | 558/177 |
| 6,297,201 B1 | 10/2001 | Geib | 507/244 |
| 6,308,788 B1 | 10/2001 | Patel et al. | 175/50 |
| 6,342,468 B1 | 1/2002 | Geib | 507/238 |
| 6,387,137 B1 | 5/2002 | Geib | 44/270 |
| 6,405,809 B2 | 6/2002 | Patel et al. | 175/50 |
| 6,511,944 B2 | 1/2003 | Taylor et al. | 507/237 |
| 6,544,934 B2 | 4/2003 | Taylor et al. | 507/238 |
| 6,557,635 B2 | 5/2003 | Nguyen et al. | 166/278 |
| 6,589,917 B2 | 7/2003 | Patel et al. | 507/138 |
| 6,598,917 B1 | 7/2003 | Hapner et al. | 294/86.4 |
| 6,608,006 B2 | 8/2003 | Taylor et al. | 507/131 |
| 6,691,805 B2 | 2/2004 | Thaemlitz | 175/65 |
| 6,790,811 B2 | 9/2004 | Patel | 507/129 |
| 6,793,025 B2 | 9/2004 | Patel et al. | 175/50 |
| 6,806,233 B2 | 10/2004 | Patel | 507/129 |
| 6,877,563 B2 | 4/2005 | Todd et al. | 166/312 |
| 6,881,709 B2 | 4/2005 | Nelson et al. | 507/203 |
| 6,883,608 B2 * | 4/2005 | Parlar et al. | 166/278 |
| 6,908,887 B2 | 6/2005 | Thaemlitz | 507/131 |
| 6,908,888 B2 | 6/2005 | Lee et al. | 507/219 |
| 6,989,354 B2 * | 1/2006 | Thaemlitz et al. | 507/131 |
| 7,021,383 B2 | 4/2006 | Todd et al. | 166/307 |
| 7,036,585 B2 | 5/2006 | Zhou et al. | 166/268 |
| 7,052,901 B2 | 5/2006 | Crews | 435/281 |
| 7,098,171 B2 | 8/2006 | Thaemlitz | 507/121 |
| 7,112,557 B2 | 9/2006 | Thaemlitz | 507/116 |
| 2002/0160921 A1 * | 10/2002 | Taylor et al. | 507/200 |
| 2003/0036484 A1 | 2/2003 | Kirsner et al. | 507/118 |
| 2003/0064897 A1 | 4/2003 | Kirsner et al. | 507/100 |
| 2003/0144153 A1 | 7/2003 | Kirnser et al. | 507/100 |
| 2003/0228985 A1 | 12/2003 | Taylor et al. | |
| 2004/0072696 A1 | 4/2004 | Patel | 507/100 |
| 2004/0176478 A1 | 9/2004 | Dahayanake et al. | 516/77 |
| 2004/0259738 A1 | 12/2004 | Patel | 507/100 |
| 2006/0041028 A1 | 2/2006 | Crews | 516/135 |
| 2006/0180308 A1 | 8/2006 | Welton et al. | 166/282 |
| 2006/0180309 A1 | 8/2006 | Welton et al. | 166/282 |
| 2006/0180310 A1 | 8/2006 | Welton et al. | 166/283 |
| 2006/0183646 A1 | 8/2006 | Welton et al. | 507/259 |

OTHER PUBLICATIONS

Halliburton brochure entitled "Accolade™ Drilling Fluid Exceeds New GOM Environmental Standards and Boosts Performance", 2002.

Paper entitled "Synthesis of Alkyl Phosphinic Acids from Silyl Phosphonites and Alkyl Halides" by E. Andrew Boyd et al., pp. 4223-4226, 1994.

Paper entitled "Unsymmetrical Dialkylphospinic Acids," pp. 2995-2997, 1958.

Paper entitled "Synthesis of r-Keto-substituted Phosphinic Acids from Bis(trimethylsiyl) phosphonite and a,β-Unsaturated Ketones," by E. Andrew Boyd et al, 1992.

U.S. Appl. No. 11/622,907, filed Jan. 12, 2007, Shumway, et al.

Heller, Jorge and Barr, John; "Poly(ortho esters)—From Concept to Reality"; BioMacromolecules; vol. 5, No. 5; pp. 1625-1632, Sep./Oct. 2004.

Quintero, L; Jones, T. (SPE) and Clark, D.E. (SPE, Baker Hughes Drilling Fluids), "One-Step Acid Removal of an Invert Emulsion", SPE 94604, pp. 1-9, 2005.

Product Data Sheet, "Baracarb," Halliburton Fluid Systems, Baroid Fluid Services, Sep. 5, 2006.

Product Data Sheet, "Geltone® II," Halliburton Fluid Systems, Baroid Fluid Services, Sep. 5, 2006.

Product Data Sheet, "Rhemod™ L," Halliburton Fluid Systems, Baroid Fluid Services, Sep. 5, 2006.

Product Data Sheet, "Le Supermul™," Halliburton Fluid Systems, Baroid Fluid Services, Jan. 9, 2007.

Designation: G 111—97; "Standard Guide for Corrosion Tests in High Temperature or High Pressure Environment, or Both"; ASTM International, pp. 1-5, Dec. 1997.

Designation: G 111—97 (Reapproved 2006); "Standard Guide for Corrosion Tests in High Temperature or High Pressure Environment, or Both"; ASTM International, pp. 1-5, May 2006.

* cited by examiner

GELLED INVERT EMULSION COMPOSITIONS COMPRISING POLYVALENT METAL SALTS OF AN ORGANOPHOSPHONIC ACID ESTER OR AN ORGANOPHOSPHINIC ACID AND METHODS OF USE AND MANUFACTURE

BACKGROUND OF THE INVENTION

The present invention relates to oil gels and associated methods of use and preparation. More particularly, the present invention relates to gelled invert emulsion compositions and their associated methods of use and preparation.

Oil gels often are suitable for use in subterranean applications. Using oil gels as opposed to aqueous-based systems may result in such advantages as improved hole stability, especially in shale formations; thinner filter cakes than achieved with aqueous-based systems; desirable lubrication of the drilling string and downhole tools; and effective penetration of salt beds without sloughing or enlargement of the hole. Other benefits are known to those skilled in the art.

Despite the many benefits of utilizing oil gels, they also may have disadvantages. Generally speaking, the use of oil gels may have high initial operating costs. These costs may be significant, depending on the depth of the hole to be drilled. However, often the higher costs can be justified if the oil gel composition prevents the caving in or hole enlargement, which can greatly increase drilling time and costs. Also, although the use of gelled oil compositions may be preferred in some instances, the practical ability to use gelled oil compositions in certain subterranean applications may be hindered because of insufficient density for well control in some cases. For instance, in a gravel packing operation, a gelled oil composition may not have sufficient density to overcome the pore pressures in the subterranean formation. This can lead to inflow of reservoir fluids and/or well bore stability problems. In most drilling operations, solids are used to increase the density of drilling fluids if desired; however, in completion operations, solids-free completion fluids are preferred to minimize potential formation damage. Conventional solids-free completion fluids, however, generally do not have sufficient properties to provide optimal fluids for such operations.

Invert emulsions are types of oil-based fluids that may be used in subterranean applications. Invert emulsions comprise a continuous phase that comprises an oleaginous fluid, and a discontinuous phase that comprises a fluid that is at least partially immiscible in the oleaginous fluid. Invert emulsions that do not have a viscosified continuous phase tend to exhibit similar advantages and disadvantages as do oil gels. Invert emulsions tend to have desirable suspension properties for particulates like drill cuttings. As such, they can easily be weighted if desired. Also, it is well known to reverse invert emulsions to regular emulsions (i.e., those that have an aqueous-based continuous phase and an oleaginous discontinuous phase) using certain conditions such as pH or protonating the surfactant so as to reverse the affinity of the surfactant for the continuous and discontinuous phases. For example, if a residual amount of an invert emulsion remains in a well bore, that portion may be reversed to a regular emulsion to clean out the emulsion from the well bore.

SUMMARY OF THE INVENTION

The present invention relates to oil gels and associated methods of use and preparation. More particularly, the present invention relates to gelled invert emulsion compositions and their associated methods of use and preparation.

In one embodiment, the present invention provides a method of treating a portion of a subterranean formation comprising the steps of: providing a gelled invert emulsion composition that comprises an oleaginous continuous phase, a discontinuous phase, and a gelling agent; and treating a portion of the subterranean formation.

In another embodiment, the present invention provides a method of increasing the viscosity of an invert emulsion composition having at least an oleaginous continuous phase and a discontinuous phase, comprising the steps of gelling the invert emulsion composition to form a gelled invert emulsion composition, the gelled invert emulsion composition having an increased viscosity as compared to the invert emulsion composition.

In another embodiment, the present invention provides a method of forming a gelled invert emulsion composition comprising the steps of: gelling an oleaginous continuous phase with a gelling agent to form an at least partially gelled oleaginous continuous phase; and incorporating a discontinuous phase with the gelled oleaginous continuous phase so as to form a gelled invert emulsion composition.

In one embodiment, the present invention provides a method of forming a gravel pack in or neighboring a portion of a subterranean formation comprising the steps of: providing a gravel pack fluid that comprises a gelled invert emulsion composition and gravel, the gelled invert emulsion composition comprising an oleaginous continuous phase, a discontinuous phase, and a gelling agent; and forming a gravel pack in or near the portion of the subterranean formation.

In one embodiment, the present invention provides a method of fracturing a portion of a subterranean formation comprising the steps of: providing a fracturing fluid that comprises a gelled invert emulsion composition that comprises an oleaginous continuous phase, a discontinuous phase, and a gelling agent; and contacting the portion of the subterranean formation with the gelled invert emulsion composition under conditions effective to create or enhance at least one fracture therein.

In one embodiment, the present invention provides a gelled invert emulsion composition comprising an oleaginous continuous phase, a discontinuous phase that is at least partially immiscible in the oleaginous phase, and a gelling agent.

The features and advantages of the present invention will be readily apparent to those skilled in the art upon a reading of the description of the preferred embodiments that follows.

DESCRIPTION OF PREFERRED EMBODIMENTS

The present invention relates to oil gels and associated methods of use and preparation. More particularly, the present invention relates to gelled invert emulsion compositions and their associated methods of use and preparation.

In certain aspects, the present invention provides gelled invert emulsion compositions that may be used in subterranean applications, e.g., subterranean well bore completion operations, because the gelled invert emulsion compositions of the present invention, inter alia, exhibit sufficient density to combat hydrostatic pressure problems while maintaining acceptable rheological characteristics. As a result, at least in some embodiments, acceptable friction pressures or lower equivalent circulating density may be observed.

The gelled invert emulsion compositions of the present invention comprise an oleaginous continuous phase, a discontinuous phase that is at least partially immiscible in the oleaginous continuous phase, and a gelling agent. In one less-preferred embodiment, a gelling agent may be added to an invert emulsion composition that comprises an oleaginous continuous phase and a discontinuous phase that is at least partially immiscible in the oleaginous continuous phase to form an at least partially gelled invert emulsion composition. In other more preferred embodiments, the gelling agent may be added to the oleaginous continuous phase to at least partially gel the oleaginous continuous phase to form a "gelled oleaginous continuous phase." The discontinuous phase that is at least partially immiscible in the oleaginous continuous phase may then be incorporated with the gelled oleaginous continuous phase so as to form an at least partially gelled invert emulsion. To achieve a desired gelled invert emulsion composition, a suitable surfactant that is commonly used to form invert emulsions may be added if desired. A suitable surfactant would be one that does not interfere with gelation. Optionally, the gelled invert emulsions of the present invention may comprise enhancers, particulate materials such as proppant or gravel, additional water, and/or breakers.

The oleaginous continuous phase of the gelled invert emulsion compositions of the present invention may comprise any oleaginous fluid suitable for use in invert emulsions. The oleaginous fluid may be from natural or synthetic sources. Examples of suitable oleaginous fluids include α-olefins, internal olefins, alkanes, aromatic solvents, cycloalkanes, liquefied petroleum gas, kerosene, diesel oils, crude oils, gas oils, fuel oils, paraffin oils, mineral oils, low toxicity mineral oils, olefins, esters, amides, synthetic oils such as polyolefins, polydiorganosiloxanes, siloxanes, organosiloxanes, ethers, acetals, dialkylcarbonates, hydrocarbons, other petroleum distillates, certain mixtures of crude oil, and combinations thereof. Examples of suitable oleaginous fluids include those commercially available from Halliburton Energy Services, Inc., in Duncan, Okla., under the tradenames "ACCOLADE™ BASE," "PETROFREE®," "PETROFREE® LV," and "PETROFREE® S.F." Factors that determine an oleaginous fluid that will be used in a particular application include, but are not limited to, cost and performance characteristics of the particular oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin may be preferred. In the Gulf of Mexico, applications may prefer to utilize "ACCOLADE™ BASE" or a low toxicity mineral oil. One skilled in the art with the benefit of this disclosure will be able to choose a suitable oleaginous fluid for a particular application in view of such considerations. In certain exemplary embodiments of the present invention, the oleaginous fluid may be a crude oil. Liquid hydrocarbons that may be specifically designed for use with $CO_2$ may be appropriate in some instances, e.g., in a dry gas well. An example of a suitable liquid hydrocarbon is commercially available from Trysol Corporation of Sundre, Alberta, Canada, under the tradename "FRACSOL™." In certain embodiments, the oleaginous fluid chosen may be the same oleaginous fluid that may be used in a drilling fluid for a given well.

The gelled invert emulsion compositions of the present invention also comprise a discontinuous phase that is at least partially immiscible in the oleaginous continuous phase. The discontinuous phase comprises a non-oleaginous fluid that is generally to at least some degree insoluble with the chosen oleaginous fluid in the continuous phase. Suitable nonoleaginous or aqueous-based fluids may include, but are not limited to, fresh water, seawater, salt water (e.g., saturated or unsaturated), and brines (e.g., saturated salt waters). Suitable brines may include heavy brines. Brines may comprise $H_2O$ soluble salts. In certain exemplary embodiments, suitable $H_2O$ soluble salts may include sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, and combinations thereof. In other exemplary embodiments, the $H_2O$ soluble salt may be any salt that reduces the water phase activity of the emulsion. Water sources that comprise monovalent and divalent ions are preferred; water sources that comprise trivalent ions are not preferred as the presence of such ions may lead to undesirable interactions in the gelled invert emulsion compositions. Factors that determine what aqueous-based fluid should be used in the discontinuous phase for a particular application include cost, availability, and which oleaginous gelled invert emulsion composition has been chosen. Another factor that may be considered is the application of the emulsion. For example, if the application needs an emulsion with a heavy weight, a zinc bromide brine may be chosen. One skilled in the art with the benefit of this disclosure in view of the considerations will be able to choose a discontinuous phase for a gelled invert emulsion composition of the present invention for a particular application.

The gelled invert emulsion compositions of the present invention comprise a gelling agent that may comprise a gelling agent capable of suitably gelling at least the oleaginous continuous phase of an invert emulsion as taught by the present invention. A few examples of some suitable gelling agents include polyvalent metal salts of organophosphonic acid esters and polyvalent metal salts of organophosphinic acids. The term "salt" as used herein and in related cases refers to polyvalent metal ion salts that can be formed directly from organophosphonic acid esters (or organophosphinic acids) by metathesis reactions comprising alkali metals or ammonium salts of organophosphonic acid esters (or organophosphinic acids), or by metathesis reactions comprising organophosphonic acid dialkyl esters (or organophosphinic acid alkyl esters). The polyvalent metal salts of the gelling agents of the present invention, inter alia, do not decompose or disassociate as readily as conventional phosphoric acid ester gelling agents. Optionally, the gelling agents of the present invention may comprise water and/or a base, if desired. In one embodiment, water and/or a base may be required to obtain the desired result. In some embodiments, the gelling agents may act as an emulsifier.

Preferred gelling agents suitable for use in the gelled invert emulsion compositions of the present invention comprise a polyvalent metal salt of an organophosphonic acid ester or a polyvalent metal salt of an organophosphinic acid. The polyvalent metal salts are made from a reaction between an activator composition and an organophosphonic acid ester or an organophosphinic acid.

Suitable activator compositions comprise a source of polyvalent metal ions that are capable of forming polyvalent metal salts of organophosphonic acid esters or organophosphinic acids when mixed with an organophosphonic acid ester or an organophosphinic acid, respectively. Examples of such suitable polyvalent metal ions include, but are not limited to, aluminum ions, gallium ions, lanthanum ions, ruthenium ions, iron ions, or lanthanide rare earth series ions. Preferred polyvalent metal ions have +3 oxidation states. When ferric iron is utilized, the source of the ions is preferably ferric sulfate or ferric chloride; ferric sulfate is generally preferred. Ferric iron salts are typically mixed with amines, surfactants, and water to form liquid activator compositions. An example of a commercially available ferric iron activator composition is "EA-3™" sold by Ethox Chemicals, Inc. of Greenville, S.C. When an aluminum compound is utilized, it is preferably selected from aluminum chloride, sodium aluminate, or aluminum isopropoxide. In certain embodiments, the ratio of metal to phosphorus in the preferred gelling agent should be about 1:3 to about 2:3. Activator compositions also may comprise amines, surfactants, water, or other suitable components.

Suitable organophosphonic acid esters have the formula:

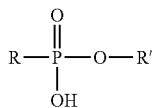

wherein R comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 6 carbon atoms. If R is a relatively small group, then R' may comprise a larger hydrocarbon group similar to that listed above with respect to R such as a linear or branched alkyl, alkenyl, aryl, alkylaryl, arylalkyl, cycloalkyl, alkyl ether, aryl ether, alkyl aryl ether group, or a mixture thereof that may have about 1 to about 30 carbon atoms. In choosing a suitable R and R', one should be mindful that if R and R' are both relatively bulky groups (e.g., if R and R' are both 2-ethylhexyl groups), then an adequate gelled invert emulsion composition may not form. Techniques that can be utilized for the preparation of organophosphonic acid esters useful in accordance with this invention include, for example, those described in U.S. Pat. No. 3,798,162 issued to Dickert, Jr. on Mar. 19, 1974, the relevant disclosure of which is incorporated herein by reference.

Suitable organophosphinic acids have the formula:

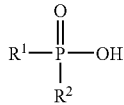

wherein $R^1$ may comprise a linear or branched hydrocarbon group having from about 1 to 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and $R^2$ may comprise a linear or branched hydrocarbon or aromatic group having from about 1 to about 6 carbon atoms. In choosing a suitable $R^1$ and $R^2$, one should be mindful that if $R^1$ and $R^2$ are both relatively bulky groups, then an adequate gelled invert emulsion composition may not form. Techniques that can be used for the preparation of an organophosphinic acid useful in accordance with this invention are well known. For example, the organophosphinic acid can be prepared from the reaction of alkylphosphonic dichloride with a Grignard reagent as reported by Crofts and Fox in "Unsymmetrical Dialkylphosphinic Acids," *J. Chem. Soc.* 1958, 2995-2997, the relevant disclosure of which is incorporated herein by reference. An exemplary reaction sequence is illustrated below:

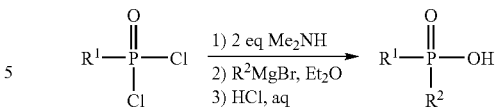

Alternatively, unsymmetrical organophosphinic acids can be prepared in a one-pot synthesis using the method of Boyd et al. in "Synthesis of γ-keto-substituted phosphinic acids from bis(trimethylsilyl)phosphonite and α,β-unsaturated ketones," *Tetrahedron Lett.,* 1992, 33, 813-816 and Boyd, E. A.; Regan, A. C.; James, K. "Synthesis of Alkyl Phosphinic Acids from Silyl Phosphonites and Alkyl Halides," *Tetrahedron Lett.,* 1994, 35, 4223-4226, the relevant disclosures of which are incorporated herein by reference. An exemplary reaction sequence is shown below:

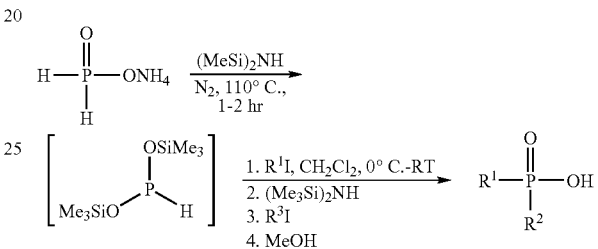

The polyvalent metal salts of organophosphonic acid esters or organophosphinic acids of the gelling agents of the present invention may be formed by any suitable method, which will be apparent to those ordinarily skilled in the art upon reading this disclosure.

If desired, enhancers may be added to a gelled invert emulsion composition, a gelling agent, an oleaginous continuous phase, a gelled oleaginous continuous phase, or an activator composition, inter alia, to provide alkalinity, improve the stability of the polyvalent metal ions in the activator composition, and/or improve the dispersability of the metal ions in the continuous phase so as to facilitate the formation of the gelled oleaginous continuous phase to form the gelled invert emulsion compositions of the present invention. In certain preferred embodiments, the enhancer may be added to the oleaginous continuous phase. Preferred enhancers should provide alkalinity and/or should facilitate gelation of the continuous phase. Examples of suitable enhancers may be defined by the general formula $C_nH_mO_xN_y$, wherein n is from about 1 to about 50, m is from about 0 to about the number of hydrogens necessary to satisfy the valence requirements of the enhancer compound, x is from about 1 to about 10 (preferably around 2), and y is from about 0 to about 10 (preferably under 3). Suitable examples would be where the ratio of C to N in the enhancer ranges from about 1:1 to about 50:1, and C to O from about 1:1 to about 20:1. Specific examples include ethoxylated amines, like triethanolamine, N,N-dibutyl ethanol amine, and oxyalkylated di-$C_2$-$C_8$ alkyl amines; N,N-diloweralkyl fatty amines; oxyalkylated fatty amine monoammonium citrate; bis(hydroxyethyl)tallowamine; and ethoxylated dehydroabietylamine. Mixtures of suitable enhancers also are suitable. If added, an enhancer may be included in an amount preferably from about 10 mol % to about 150 mol % based on the metal; the enhancer may also be included in an amount of from about 3 mol % to about 75 mol % based on the gelling agent. An example of a suitable enhancer is a surfactant. Surfactants may be added to facilitate the formation of the gelled invert emulsion compositions. Surfactants may decrease the gelation time of the gelled invert emulsion compositions because they may allow for a better dispersion of the metal ions in the oleaginous continuous phase. Suitable surfactants that may be used include basic surfactants, especially those that may comprise an amine group. Use of about 0.1% to about 10.0% w/v of a suitable surfactant based on the amount of the gelling agent may be beneficial, inter alia, to help speed formation of gelled invert emulsion composition or to impart desirable rheological characteristics to the gelled invert emulsion composition. "w/v" as used herein refers to the weight of the component based on the volume of the oleaginous continuous phase that is present in the gelled invert emulsion composition. Some specific examples of suitable surfactants include imidazoline, fatty acid soaps, a fatty acid, dioctyl sulphosuccinate, sodium alkyl benzene sulphonate, fatty acid esters, fatty acid alkanolamides, and amido betaines.

In certain embodiments, the gelled invert emulsion compositions of the present invention may comprise particulate materials, e.g., proppant or gravel, that can be utilized, for example, in stimulation or completion operations, such as fracturing or gravel packing. Suitable particulate materials include, but are not limited to, low-density particulates (e.g., those that have a specific gravity that is less than sand), graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application for which the particulate materials are being used, characteristics of the subterranean formation, characteristics of the particular gelled invert emulsion compositions being used, as well as other variables known to those skilled in the art with the benefit of this disclosure. Generally, the particulate sizes may vary in the range of from about 2 to about 200 mesh, U.S. Sieve Series scale. One of ordinary skill in the art with the benefit of this disclosure will be able to choose an appropriate particulate material for a given application.

If a gelled invert emulsion composition of the present invention is being used in an application wherein it may be desirable to eventually reduce the viscosity of the gelled invert emulsion composition, for example, to recover it from the subterranean formation at a desired time, then a suitable breaker may be included in or added to the gelled invert emulsion composition. In some gravel packing embodiments, a suitable breaker may be included with the gravel material so that it can be released into the pack and break the gravel pack gelled invert emulsion composition over time. Any breaker that is able to reduce the viscosity of the gelled invert emulsion compositions when desired is suitable for use in the compositions and methods of the present invention. In certain preferred embodiments, delayed gel breakers that will react with the gelled invert emulsion compositions after desired delay periods may be used. Suitable delayed gel breakers can be materials that are slowly soluble in water, those that are encapsulated, or those that are otherwise designed to slowly solubilize in a gelled invert emulsion composition. In certain preferred embodiments wherein these types of breakers are used, the breaking of the gelled invert emulsion composition does not take place until the slowly soluble breakers are at least partially dissolved by a water component. Examples of such slowly soluble breakers are given in U.S. Pat. No. 5,846,915, issued to Smith et al. on Dec. 8, 1998, the relevant disclosure of which is incorporated by reference. Hard-burned magnesium oxide, especially that having a particle size that will pass through a 200 mesh Tyler screen, is a preferred delayed gel breaker. In one embodiment, solid magnesium oxide may be included with the particulates (e.g., gravel in a gravel pack operation) so that it can be released over time. Other breakers such as alkali metal carbonates, alkali metal bicarbonates, alkali metal acetates, other alkaline earth metal oxides, alkali metal hydroxides, amines, weak acids, and the like can be encapsulated with slowly water soluble or other suitable encapsulating materials. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics, other polymeric materials, and the like. In certain embodiments, when a polyvalent metal salt of an organophosphonic acid ester and an alkaline breaker are utilized, e.g., magnesium oxide, an initial increase in the viscosity of the gelled invert emulsion composition may be observed, after which the gelled invert emulsion composition may be broken. If used, the delayed gel breaker may be present in the gelled invert emulsion compositions of the present invention in an amount in the range of from about 0.01% to about 3% w/v, more preferably in an amount in the range of from about 0.05% to about 1% w/v.

Another type of breaker that may be utilized when the gelling agent is a ferric iron polyvalent metal salt of an organophosphonic acid ester or a ferric iron polyvalent metal salt of the organophosphinic acid is a reducing agent that reduces ferric iron to ferrous iron. Of the various oxidation states of iron, ferric iron is capable of forming a viscosifying coordination salt with an organophosphonic acid ester or organophosphinic acid, therefore the salt may be disassociated by reducing the ferric iron to the ferrous state. The disassociation may lead to a reduction in the viscosity of a gelled invert emulsion composition. Examples of reducing agents which may be utilized include, but are not limited to, stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite. As mentioned above in connection with other breakers that can be used, the reducing agent utilized also can be delayed by encapsulating it with a slowly water soluble or other suitable encapsulating material. If used, the gel breaker is generally present therein in an amount in the range of from about 0.01% to about 3% w/v, more preferably in an amount in the range of from about 0.05% to about 1% w/v.

The gelled invert emulsion compositions of the present invention may be prepared by any suitable method. For instance, in some embodiments, a gelling agent may be added to an invert emulsion composition that comprises an oleaginous continuous phase and a discontinuous phase that is at least partially immiscible in the oleaginous continuous phase to form an at least partially gelled invert emulsion composition. In other more preferred embodiments, the gelling agent may be added to the oleaginous continuous phase to at least partially gel the oleaginous continuous phase to form a "gelled oleaginous continuous phase." The discontinuous phase that is at least partially immiscible in the oleaginous continuous phase may then be incorporated with the gelled oleaginous continuous phase so as to form an at least partially gelled invert emulsion.

In some cases, a gelled invert emulsion composition of the present invention may be produced at the well site. In an example of such an on-site method, a gelling agent that comprises an organophosphonic acid ester or an organophosphinic acid may be added to a suitable amount of an activator composition that comprises a source of polyvalent metal ions so as to form a gelling agent comprising a polyvalent metal salt of an organophosphonic acid ester or a polyvalent metal salt of an organophosphinic acid. In certain preferred embodiments, the gelling agent may be added to the oleaginous continuous phase to form a gelled oleaginous continuous phase, to which a discontinuous phase that is at least partially immiscible in the oleaginous continuous phase may be added to form an at least partially gelled invert emulsion composition. In other less-preferred embodiments, the gelling agent may be added to an invert emulsion composition that comprises a continuous oleaginous phase and a discontinuous phase that is at least partially immiscible in the continuous oleaginous phase. If desired, the gelled invert emulsion compositions of the present invention may be preblended and then shipped to the site of use. Such methods may be preferred, for example, when these compositions are to be used in offshore applications, e.g., because the equipment and storage volumes may be reduced.

In certain embodiments, a gelling agent of the present invention that comprises a polyvalent metal salt of an organophosphonic acid ester or a polyvalent metal salt of an organophosphinic acid may be formed off-site, and then added to an oleaginous continuous phase, e.g., off-site or at the well site, to form an at least partially gelled oleaginous continuous phase that may be incorporated, e.g., off-site or at the well site, with a discontinuous phase that is at least partially immiscible in the gelled oleaginous continuous phase. In an example of such a method, the polyvalent metal salt may be prepared by any method that is suitable for forming solid salt particulates (e.g., flakes, pellets, or other particulates) that later can be introduced to a gelled invert emulsion composition. In less-preferred methods, polyvalent metal salt particulates may be transported to the well site where they can be added to an invert emulsion composition. In one embodiment of such a technique, after the salt particulates are added to the oleaginous continuous phase, no significant increase in the viscosity in the oleaginous continuous phase may be realized until the temperature of the oleaginous continuous phase is sufficient to enable the salt particulates to dissolve.

Although certain methodologies of making a gelled invert emulsion compositions of the present invention have been discussed in detail, one should note that, in certain preferred embodiments, it is preferable to gel the oleaginous continuous phase before incorporating the discontinuous phase so as to form a gelled invert emulsion composition. If done in another order, an additional surfactant (such as a bis(hydroxyethyl)tallowamine or the like) may be needed to achieve a desirable gelled invert emulsion composition. Other methods of forming suitable gelled invert emulsion compositions of the present invention may be suitable as well.

A preferred method of preparing a gelled invert emulsion composition of this invention comprises adding an activator composition that comprises a source of polyvalent metal ions and an organophosphonic acid ester to an oleaginous continuous phase to form an at least partially gelled invert emulsion composition, the organophosphonic acid ester having the formula:

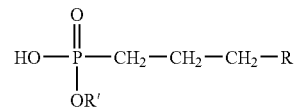

where R represents a hydrocarbon group having the general formula $C_nH_{2n+1}$, where n is from about 3 to about 21 and R' preferably comprises a methyl or ethyl group, or adding an organophosphinic acid having the formula:

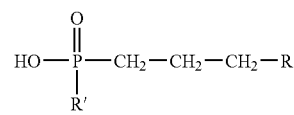

where R represents a hydrocarbon group having the general formula $C_nH_{2n+1}$, where n is from about 3 to about 21 and R' preferably is either methyl or ethyl, so as to form a suitable polyvalent metal salt thereof that will at least partially gel the oleaginous continuous phase. The discontinuous phase that is at least partially immiscible in the oleaginous continuous phase may then be added to the at least partially gelled oleaginous continuous phase to form a gelled invert emulsion composition of the present invention. In a preferred embodiment, the source of polyvalent metal ions comprises aluminum or iron. The resultant polyvalent metal salt of the organophosphonic acid ester or the polyvalent metal salt of the organophosphinic acid may be present in an amount in the range of from about 0.1% to about 10.0% w/v, more preferably in an amount in the range of from about 0.2% to about 2% w/v. Optionally, an enhancer and/or a breaker may be added to a component of the gelled invert emulsion composition and/or to the gelled invert emulsion composition. If an enhancer is added to a component of the gelled invert emulsion composition (e.g., the continuous phase, the activator composition, etc.) or to the gelled invert emulsion composition, it should be included in an amount of about 0.1% to about 10% w/v. If a delayed gel breaker is used, the delayed gel breaker may be present in the gelled invert emulsion composition in an amount in the range of from about 0.01% to about 3% by weight of the oleaginous continuous phase, more preferably in an amount in the range of from about 0.05% to about 1%.

A preferred gelling agent of this invention comprises a ferric iron or aluminum polyvalent metal salt of an organophosphonic acid ester, the organophosphonic acid ester having the formula:

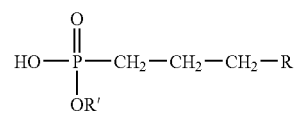

where R represents a hydrocarbon group having the general formula $C_nH_{2n+1}$, where n is from about 3 to about 21 and R' preferably is methyl or ethyl, or an organophosphinic acid having the formula:

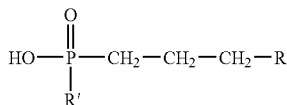

where R represents a linear or branched alkyl chain having the general formula $C_nH_{2n+1}$, where n is from about 1 to about 21 and R' preferably is a methyl or ethyl. Another preferred gelling agent comprises a ferric iron polyvalent metal salt of an organophosphonic acid ester, the organophosphonic acid ester having the formula:

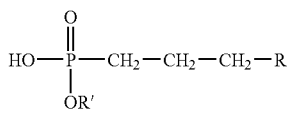

where R represents a linear or branched alkyl chain having the general formula $C_nH_{2n+1}$, where n is from about 1 to about 21 and R' preferably is a methyl or ethyl group, or an organophosphinic acid having the formula:

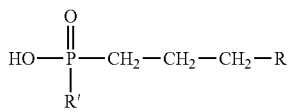

where R represents a linear or branched alkyl chain having the general formula $C_nH_{2n+1}$, where n is from about 1 to about 21 and R' preferably is a methyl or ethyl group.

An exemplary method of the present invention of treating a portion of a subterranean formation comprises the steps of: providing a gelled invert emulsion composition of the present invention that comprises an at least partially gelled oleaginous continuous phase, a discontinuous phase that is at least partially immiscible in the oleaginous continuous phase, and a gelling agent, wherein the gelling agent that comprises a polyvalent metal salt of an organophosphonic acid ester or a polyvalent metal salt of an organophosphinic acid, and treating the subterranean formation with the gelled invert emulsion composition. Treating the subterranean formation may involve drilling a well bore in or near a portion of the subterranean formation, fracturing a portion of the subterranean formation, performing a sand control treatment in or neighboring a portion of the subterranean formation (e.g., gravel packing), providing a plugging agent (e.g., pill), providing a well bore cleanup fluid, or performing a viscous sweep. U.S. Pat. No. 6,218,342, assigned to M-I L.L.C, the relevant disclosure of which is incorporated by reference, describes the use of invert emulsions as drilling fluids. U.S. Pat. No. 5,271,464 assigned to Halliburton Company, the relevant disclosure of which is incorporated by reference, describes providing a plugging agent with a gel. U.S. Pat. Nos. 4,473,408 and 4,003,393, both assigned to The Dow Chemical Company, the relevant disclosures of which are incorporated by reference, describe the use of organic gels for cleaning the interior of a pipeline. U.S. Pat. No. 5,034,139 assigned to Nalco Chemical Company, the relevant disclosure of which is incorporated by reference, describes the use of a thixotropic gel as a viscous sweep. In certain of such embodiments, the gelling agent that comprises a polyvalent metal salt of an organophosphonic acid ester or a polyvalent metal salt of an organophosphinic acid may be present in the gelled invert emulsion in an amount in the range of from about 0.1% to about 10.0% w/v.

In certain embodiments, the gelled invert emulsion compositions of the present invention may be useful in conjunction with or as drilling fluids that may be useful in drilling at least some portions of subterranean well bores. When performing such embodiments, one should be mindful that the stability of the gelled invert emulsion composition should be compatible with the goals of the drilling operation. pH optimization may be helpful in obtaining suitable stabilization if needed. In one embodiment, a drilling fluid comprising a gelled invert emulsion composition of the present invention may be prepared. Additional additives usually used in conjunction with drilling fluids may be added as well. Examples include weighting agents, organophilic clays, wetting agents, bridging agents, fluid loss control agents, and the like. A drilling operation utilizing the drilling fluid may then be performed to drill at least a portion of a well bore in a subterranean formation.

In certain embodiments, the gelled invert emulsion compositions of the present invention may be used in conjunction with or as fracturing fluids in stimulation operations that may be performed to stimulate portions of subterranean formations. In such embodiments, a fracturing fluid comprising a gelled invert emulsion composition of the present invention may be provided. In one example, a gelling agent comprising a polyvalent metal salt of an organophosphonic acid ester or a polyvalent metal salt of an organophosphinic acid may be added to an oleaginous continuous phase fluid to form an at least partially gelled oleaginous continuous phase. A discontinuous phase fluid that is at least partially immiscible in the oleaginous continuous phase may then be incorporated with the gelled oleaginous continuous phase so as to form an at least partially gelled invert emulsion composition of the present invention. In certain fracturing embodiments, the gelling agent may be added to the oleaginous continuous phase in an amount in the range of from about 0.1% to about 5% w/v. Optionally, a gelled invert emulsion composition of the present invention that is used in a fracturing operation may comprise an enhancer, a breaker, and/or proppant.

A preferred method of the present invention of fracturing a portion of a subterranean formation comprises the steps of: providing a gelled invert emulsion composition of the present invention that comprises a gelling agent that comprises a polyvalent metal salt of an organophosphonic acid ester, the organophosphonic acid ester having the formula:

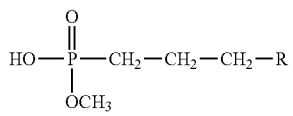

where R represents a hydrocarbon group having the general formula $C_nH_{2n+1}$, where n is from about 3 to about 21, or a polyvalent metal salt of an organophosphinic acid, organophosphinic acid having the formula:

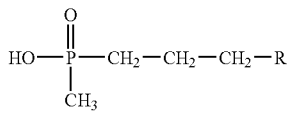

where R represents a linear or branched alkyl chain having the general formula $C_nH_{2n+1}$, where n is from about 3 to about 21; and contacting a portion of the subterranean formation with the gelled invert emulsion composition under conditions effective to create or enhance at least one fracture therein. In certain embodiments, the gelling agent may be present in the gelled invert emulsion composition in an amount in the range of from about 0.1% to about 5.0% w/v, more preferably in an amount in the range of from about 0.2% to about 2.5% w/v. In certain embodiments, the gelled invert emulsion composition may comprise an enhancer, a breaker, and/or proppant material. If used, in certain embodiments, the proppant material may be present in the gelled invert emulsion composition in an amount in the range of from about 1 to about 32 pounds of proppant material per gallon of the gelled invert emulsion composition, more preferably in the range of about 1 to about 22 pounds per gallon. If desired, water may be added if not otherwise present in the gelled invert emulsion composition, so that, e.g., a delayed gel breaker may be utilized. A suitable delayed gel breaker may be present in the gelled invert emulsion composition in an amount in the range of from about 0.01% to about 3% w/v, more preferably in an amount in the range of from about 0.05% to about 1% w/v.

In an example of a preferred gravel pack operation, a gelled invert emulsion composition comprising an oleaginous continuous phase, a discontinuous phase, gravel, and a gelling agent that comprises a polyvalent metal salt of an organophosphonic acid ester or a polyvalent metal salt of an organophosphinic acid may be introduced to a portion of a subterranean formation in a manner so as to form a gravel pack in or neighboring the portion of the subterranean formation. Optionally, the gelled invert emulsion composition may comprise water and or a base to achieve a desired gel. The gelled invert emulsion compositions of the present invention may be especially useful for alternate path (a term known in the art) gravel pack assemblies wherein by-pass tubes are used to transport slurry to any voids that may exist in a gravel pack. U.S. Pat. Nos. 5,890,533 and 6,557,635 describe alternate path processes. The disclosures of these patents are incorporated herein by reference. The compositions of the present invention may be useful in such application at least because they will help to minimize the pumping pressure during the Alternate Path process.

In some embodiments, the gelled invert emulsion compositions of the present invention may be used in conjunction with sand control operations (e.g., as a gravel pack fluid) that may be performed to provide some degree of sand control to a desired portion of a subterranean formation. In one embodiment of a method of the present invention of providing sand control to a portion of a subterranean formation comprises the steps of: contacting the portion of the subterranean formation with a gelled invert emulsion composition of the present invention that comprises gravel so as to create a gravel pack in or neighboring that portion of the subterranean formation. In certain embodiments, the gelling agent may be present in the gelled invert emulsion composition in an amount in the range of from about 0.1% to about 5.0% w/v, more preferably in an amount in the range of from about 0.2% to about 2.5% w/v. In certain embodiments, the gravel particulates may be present in the gelled invert emulsion composition in an amount in the range of from about 1 to about 32 pounds of proppant material per gallon of the gelled invert emulsion composition, more preferably in the range of about 1 to about 22 pounds per gallon. As mentioned, if desired, water may be added, if not otherwise present in gelled invert emulsion composition, e.g., so that a delayed gel breaker may be utilized. A suitable delayed gel breaker may be present in the gelled invert emulsion composition in an amount in the range of from about 0.01% to about 10% w/v, more preferably in an amount in the range of from about 0.05% to about 3% w/v.

To facilitate a better understanding of the present invention, the following examples of preferred embodiments are given. In no way should the following examples be read to limit, or to define, the scope of the invention.

EXAMPLES

In this example, 245 ml of diesel gelled with 0.5% v/v decanephosphonic acid, monoethyl ester and 0.5% v/v of a ferric iron activator solution known as MO-86 was mixed in a blender with 105 ml of 38% w/w calcium chloride brine. 0.35 ml of 25% NaOH was added to the misture to thicken the mixture. Viscosity was measured at ambient temperature using a Fann Model 35 viscometer. For comparison, the viscosity data for diesel gelled with 0.5% decanephosphonic acid, monomethyl ester and 0.5% v/v MO-86 also is shown.

TABLE 1

| Shear Rate, sec$^{-1}$ | Gelled Invert Emulsion Composition Apparent Viscosity, cP | Gelled Diesel Apparent Viscosity, cP |
| --- | --- | --- |
| 5 | 3900 | 4200 |
| 10 | 2650 | 3550 |
| 170 | 276 | 135 |
| 341 | 137 | 120 |
| 511 | 95 | 95 |
| 1022 | 58 | 53 |

The emulsion was observed to be stable for several hours with complete separation overnight. No additional emulsifiers were used in this example. Additional stabilization may be possible, perhaps by adjusting the pH. Under dynamic pumping conditions such as those involved in subterranean treatment operations, the emulsion should remain stable.

Therefore, the present invention is well adapted to attain the ends and advantages mentioned as well as those that are inherent therein. While those skilled in the art may make numerous changes, such changes are encompassed within the spirit of this invention as defined by the appended claims.

What is claimed is:

1. A method of treating a portion of a subterranean formation comprising:
providing a gelled invert emulsion composition that comprises an oleaginous continuous phase, a discontinuous phase, and a gelling agent, wherein the gelling agent comprises at least one gelling agent selected from the group consisting of a polyvalent metal salt of an organophosphonic acid ester and a polyvalent metal salt of an organophosphinic acid; and
treating a portion of a subterranean formation with the gelled invert emulsion composition.

2. The method of claim 1 wherein the gelled invert emulsion composition, the oleaginous continuous phase, or the gelling agent comprises an enhancer.

3. The method of claim 2 wherein the enhancer has the formula:

$$C_nH_mO_xN_y$$

wherein n is from about 1 to about 50, m is from about 0 to about the number of hydrogens necessary to satisfy the valence requirements of the enhancer compound, x is from about 1 to about 10, and y is from about 0 to about 10.

4. The method of claim 3 wherein the ratio of C to N ranges from about 1:1 to about 50:1, and the ratio of C to O ranges from about 1:1 to about 20:1.

5. The method of claim 2 wherein the enhancer comprises a surfactant.

6. The method of claim 5 wherein the surfactant comprises at least one surfactant selected from the group consisting of imidazoline, a fatty acid ester, a fatty acid alkanolamide, and an amido betaine.

7. The method of claim 5 wherein the enhancer is present in an amount of about 0.1% to about 10% based on the amount of the gelling agent.

8. The method of claim 2 wherein the enhancer comprises at least one enhancer selected from the group consisting of an ethoxylated amine, a fatty amine, a tallow amine, and a mixture thereof.

9. The method of claim 1 wherein the discontinuous phase comprises a water soluble salt.

10. The method of claim 9 wherein the water soluble salt comprises at least one water soluble salt selected from the group consisting of sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, and a combination thereof.

11. The method of claim 1 wherein the gelled invert emulsion composition comprises particulate materials.

12. The method of claim 11 wherein the particulate materials comprise at least one component selected from the group consisting of low-density particulates, graded nut shells, nut shells, graded sand, sintered bauxite, particulate ceramic materials, glass beads, and particulate polymeric materials.

13. The method of claim 11 wherein the particulate materials vary in size in the range of from about 2 to about 200 mesh U.S. Sieve Series.

14. The method of claim 1 wherein the gelled invert emulsion composition comprises a breaker.

15. The method of claim 14 wherein the breaker comprises a delayed gel breaker.

16. The method of claim 14 wherein the breaker comprises hard burned magnesium oxide.

17. The method of claim 14 wherein the breaker comprises at least one breaker selected from the group consisting of an alkali metal carbonate, an alkali metal bicarbonate, an alkali metal acetate, an alkaline earth metal oxide, an alkali metal hydroxide, an amine, a weak acid, and a reducing agent that is capable of reducing ferric iron to ferrous iron.

18. The method of claim 14 wherein the breaker comprises an encapsulated breaker.

19. The method of claim 1 wherein the polyvalent metal salt of an organophosphinic acid is made by a reaction between an organophosphinic acid and an activator composition that comprises at least one component selected from the group consisting of aluminum ions, gallium ions, lanthanum ions, ruthenium ions, iron ions, and lanthanide rare earth series ions.

20. The method of claim 19 wherein the organophosphinic acid has the formula:

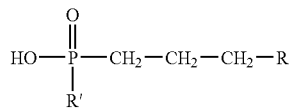

where R represents a linear or branched alkyl chain having the general formula $C_nH_{2n+1}$, where n is from about 1 to about 21 and R' is a methyl or ethyl.

21. The method of claim 1 wherein the step of providing the gelled invert emulsion composition comprises:
gelling the oleaginous continuous phase with the gelling agent to form an at least partially gelled oleaginous continuous phase; and
incorporating the discontinuous phase with the gelled oleaginous continuous phase so as to form the gelled invert emulsion composition.

22. The method of claim 1 further comprising adding a surfactant to the gelled invert emulsion composition.

23. The method of claim 1 further comprising adding water and/or a base to the gelled invert emulsion composition.

24. The method of claim 1 wherein the oleaginous continuous phase comprises at least one oleaginous component selected from the group consisting of an α olefin, an internal olefin, an alkane, an aromatic solvent, a cycloalkane, liquefied petroleum gas, kerosene, a diesel oil, a crude oil, a gas oil, a fuel oil, a paraffin oil, a mineral oil, a low toxicity mineral oil, an olefin, an ester, an amide, a synthetic oil, a polyolefin, a polydiorganosiloxane, a siloxane, an organosiloxane, an ether, an acetal, a dialkylcarbonate, a hydrocarbon, a other petroleum distillate, a crude oil mixture, and a combination thereof.

25. The method of claim 1 wherein the discontinuous phase comprises at least one nonoleaginous component selected from the group consisting of fresh water, seawater, salt water, and a brine.

26. The method of claim 1 wherein the gelling agent is present in an amount of from about 0.1% to about 10% w/v.

27. The method of claim 1 wherein the polyvalent metal salt of an organophosphonic acid ester is made by a reaction between an organophosphonic acid ester and an activator composition that comprises at least one component selected from the group consisting of aluminum ions, gallium ions, lanthanum ions, ruthenium ions, iron ion, and lanthanide rare earth series ions.

28. The method of claim 1 wherein the polyvalent metal salt of an organophosphonic acid ester is formed from a reaction of an activator composition that comprises a source of polyvalent metal ions and an organophosphonic acid ester that has the formula:

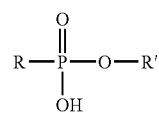

wherein R or R' comprises a hydrocarbon group having from about 1 to about 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof; R or R' comprises a hydrocarbon group having from about 1 to about 6 carbon atoms; and R and R' are not the same group.

29. The method of claim 1 wherein the polyvalent metal salt of an organophosphonic acid ester is formed by a reaction of an activator composition that comprises a source of polyvalent metal ions and an organophosphonic acid ester having the formula:

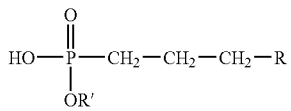

where R represents a hydrocarbon group having the general formula $C_nH_{2n+1}$, where n is from about 3 to about 21 and R' comprises a methyl or ethyl group.

30. The method of claim 1 wherein the organophosphinic acid has the formula:

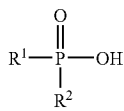

wherein $R^1$ or $R^2$ comprises a linear or branched hydrocarbon group having from about 1 to 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof; $R^1$ or $R^2$ comprises a linear or branched hydrocarbon or aromatic group having from about 1 to about 6 carbon atoms; and $R^1$ and $R^2$ are not the same group.

31. The method of claim 1 wherein treating the portion of the subterranean formation involves at least one operation selected from the group consisting of drilling a portion of a well bore in the subterranean formation, fracturing the subterranean formation, performing a sand control treatment, performing an alternate path gravel packing process, providing a plugging agent, performing a clean-up operation, and performing a viscous sweep.

32. A method of forming a gravel pack comprising:
providing a gravel pack fluid in a portion of a subterranean formation, wherein the gravel pack fluid comprises a gelled invert emulsion composition and gravel, the gelled invert emulsion composition comprising an oleaginous continuous phase, a discontinuous phase, and a gelling agent, wherein the gelling agent comprises at least one gelling agent selected from the group consisting of a polyvalent metal salt of an organophosphonic acid ester and a polyvalent metal salt of an organophosphinic acid; and
allowing the gravel pack fluid to form a gravel pack in or near the portion of the subterranean formation.

33. The method of claim 32 wherein the gelled invert emulsion composition, the oleaginous continuous phase, or the gelling agent comprise an enhancer.

34. The method of claim 33 wherein the enhancer has the formula:

wherein n is from about 1 to about 50, m is from about 0 to about the number of hydrogens necessary to satisfy the valence requirements of the enhancer compound, x is from about 1 to about 10, and y is from about 0 to about 10.

35. The method of claim 32 wherein the gelling agent is present in an amount of from about 0.1% to about 10% w/v.

36. The method of claim 32 wherein the polyvalent metal salt of an organophosphonic acid ester is made by a reaction between an organophosphonic acid ester and an activator composition that comprises at least one component selected from the group consisting of aluminum ions, gallium ions, lanthanum ions, ruthenium ions, iron ion, and lanthanide rare earth series ions.

37. The method of claim 32 wherein the polyvalent metal salt of an organophosphonic acid ester is formed from a reaction of an activator composition that comprises a source of polyvalent metal ions and an organophosphonic acid ester that has the formula:

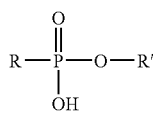

wherein R or R' comprises a hydrocarbon group having from about 1 to about 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof R or R' comprises a hydrocarbon group having from about 1 to about 6 carbon atoms; and R and R' are not the same group.

38. The method of claim 32 wherein the polyvalent metal salt of an organophosphonic acid ester is formed by a reaction of an activator composition that comprises a source of polyvalent metal ions and an organophosphonic acid ester having the formula:

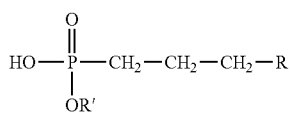

where R represents a hydrocarbon group having the general formula $C_nH_{2n+1}$, where n is from about 3 to about 21 and R' comprises a methyl or ethyl group.

39. The method of claim 32 wherein the polyvalent metal salt of an organophosphinic acid is made by a reaction between an organophosphinic acid and an activator composition that comprises at least one component selected from the group consisting of aluminum ions, gallium ions, lanthanum ions, ruthenium ions, iron ions, and lanthanide rare earth series ions.

40. The method of claim 32 wherein the organophosphinic acid has the formula:

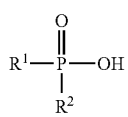

wherein $R^1$ or $R^2$ comprises a linear or branched hydrocarbon group having from about 1 to 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof; $R^1$ or $R^2$ comprises a linear or branched hydrocarbon or aromatic group having from about 1 to about 6 carbon atoms; and $R^1$ and $R^2$ are not the same group.

41. The method of claim 32 wherein the organophosphinic acid has the formula:

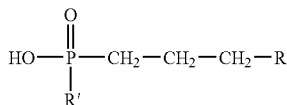

where R represents a linear or branched alkyl chain having the general formula $C_nH_{2n+1}$, where n is from about 1 to about 21, and R' is a methyl or ethyl.

42. The method of claim 32 wherein the gravel is present in an amount in the range of from about 1 to about 32 pounds of gravel material per gallon of the gelled invert emulsion composition.

43. The method of claim 32 wherein the gelled invert emulsion composition further comprises a delayed gel breaker.

44. A method of fracturing a portion of a subterranean formation comprising:
providing a fracturing fluid that comprises a gelled invert emulsion composition that comprises an oleaginous continuous phase, a discontinuous phase, and a gelling agent wherein the gelling agent comprises at least one gelling agent selected from the group consisting of a polyvalent metal salt of an organophosphonic acid ester and a polyvalent metal salt of an organophosphinic acid; and
contacting a portion of a subterranean formation with the gelled invert emulsion composition under conditions effective to create or enhance at least one fracture therein.

45. The method of claim 44 wherein the gelled invert emulsion composition, the oleaginous continuous phase, or the gelling agent comprise an enhancer.

46. The method of claim 45 wherein the enhancer has the formula:

$C_nH_mO_xN_y$, wherein n is from about 1 to about 50, m is from about 0 to about the number of hydrogens necessary to satisfy the valence requirements of the enhancer compound, x is from about 1 to about 10, and y is from about 0 to about 10.

47. The method of claim 44 wherein the gelled invert emulsion composition further comprises proppant materials.

48. The method of claim 44 wherein the gelling agent is present in an amount of from about 0.1% to about 10% w/v.

49. The method of claim 44 wherein the polyvalent metal salt of an organophosphonic acid ester is made by a reaction between an organophosphonic acid ester and an activator composition that comprises at least one component selected from the group consisting of aluminum ions, gallium ions, lanthanum ions, ruthenium ions, iron ions, and lanthanide rare earth series ions.

50. The method of claim 44 wherein the polyvalent metal salt of an organophosphonic acid ester is formed from a reaction of an activator composition that comprises a source of polyvalent metal ions and an organophosphonic acid ester that has the formula:

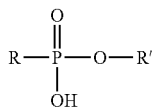

wherein R or R' comprises a hydrocarbon group having from about 1 to about 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof; R or R' comprises a hydrocarbon group having from about 1 to about 6 carbon atoms; and R and R' are not the same group.

51. The method of claim 44 wherein the polyvalent metal salt of an organophosphonic acid ester is formed by a reaction of an activator composition that comprises a source of polyvalent metal ions and an organophosphonic acid ester having the formula:

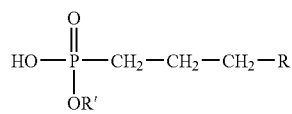

where R represents a hydrocarbon group having the general formula $C_nH_{2n+1}$, 1 where n is from about 3 to about 21 and R' comprises a methyl or ethyl group.

52. The method of claim 44 wherein the polyvalent metal salt of an organophosphinic acid is made by a reaction between an organophosphinic acid and an activator composition that comprises at least one component selected from the group consisting of aluminum ions, gallium ions, lanthanum ions, ruthenium ions, iron ions, and lanthanide rare earth series ions.

53. The method of claim 44 wherein the organophosphinic acid has the formula:

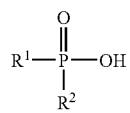

wherein $R^1$ or $R^2$ comprise a linear or branched hydrocarbon group having from about 1 to 30 carbon atoms that comprise at least one hydrocarbon group selected from the group consisting of a linear or branched alkyl, alkenyl, aryl, alkylaryl, arylalkyl, cycloalkyl, alkyl ether, aryl ether, alkyl aryl ether, and a mixture thereof; $R^1$ or $R^2$ comprises a linear or branched hydrocarbon or aromatic group having from about 1 to about 6 carbon atoms; and $R^1$ and $R^2$ are not the same group.

54. The method of claim 44 wherein the organophosphinic acid has the formula:

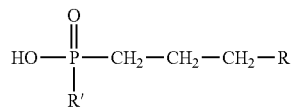

where R represents a linear or branched alkyl chain having the general formula $C_nH_{2n+1}$, where n is from about 1 to about 21 and R' is a methyl or ethyl.

55. The method of claim 44 wherein the gelled invert emulsion composition further comprises a delayed gel breaker.

* * * * *